United States Patent
Pfeiffer et al.

[11] 4,050,901
[45] Sept. 27, 1977

[54] COOLING UNIT FOR LARGE POLYMERIZATION VESSELS

[75] Inventors: Kurt Pfeiffer; Johannes Dietrich; Günter Beckmann; Karl-Heinz Herkt, all of Marl, Germany

[73] Assignee: Chemische Werke Huls Aktiengesellschaft, Germany

[21] Appl. No.: 366,520

[22] Filed: June 4, 1973

Related U.S. Application Data

[62] Division of Ser. No. 167,568, July 3, 1971, Pat. No. 3,785,430.

[30] Foreign Application Priority Data

Aug. 1, 1970   Germany ............................ 2038363

[51] Int. Cl.² ............................................... B01J 1/00
[52] U.S. Cl. ...................................... 23/285; 260/695
[58] Field of Search ......................... 23/283, 285, 260; 260/92.8 W, 695

[56] References Cited

U.S. PATENT DOCUMENTS

| | | |
|---|---|---|
| 1,916,473 | 7/1933 | Forrest et al. ................... 23/285 UX |
| 2,817,692 | 12/1957 | Penick et al. ...................... 23/285 X |
| 3,259,614 | 7/1966 | Pollock ............................... 23/285 X |
| 3,439,065 | 4/1969 | Luftglass .................... 260/92.8 W X |
| 3,472,630 | 10/1969 | Baldwin et al. ......................... 23/285 |
| 3,481,701 | 12/1969 | Otsuka et al. ...................... 23/283 X |
| 3,560,460 | 2/1971 | Gilbert ................................ 23/283 X |
| 3,595,848 | 7/1971 | Reinecke et al. ............. 260/92.8 W |

FOREIGN PATENT DOCUMENTS 1,385,374   12/1964   France ........................... 260/92.8 W

*Primary Examiner*—Joseph Scovronek
*Assistant Examiner*—Arnold Turk
*Attorney, Agent, or Firm*—Craig & Antonelli

[57] ABSTRACT

This invention relates to a process and apparatus for the cooling of polymerization charges in emulsion, suspension, solution, and bulk polymerizations in connection with incompletely filled polymerization reactors or vessels having capacities of 40 m³ or greater and thermal loads of more than 500,000 kcal/h with the aid of a reflux condenser or cooler which is in communication with the gas space of a polymerization vessel.

9 Claims, 1 Drawing Figure

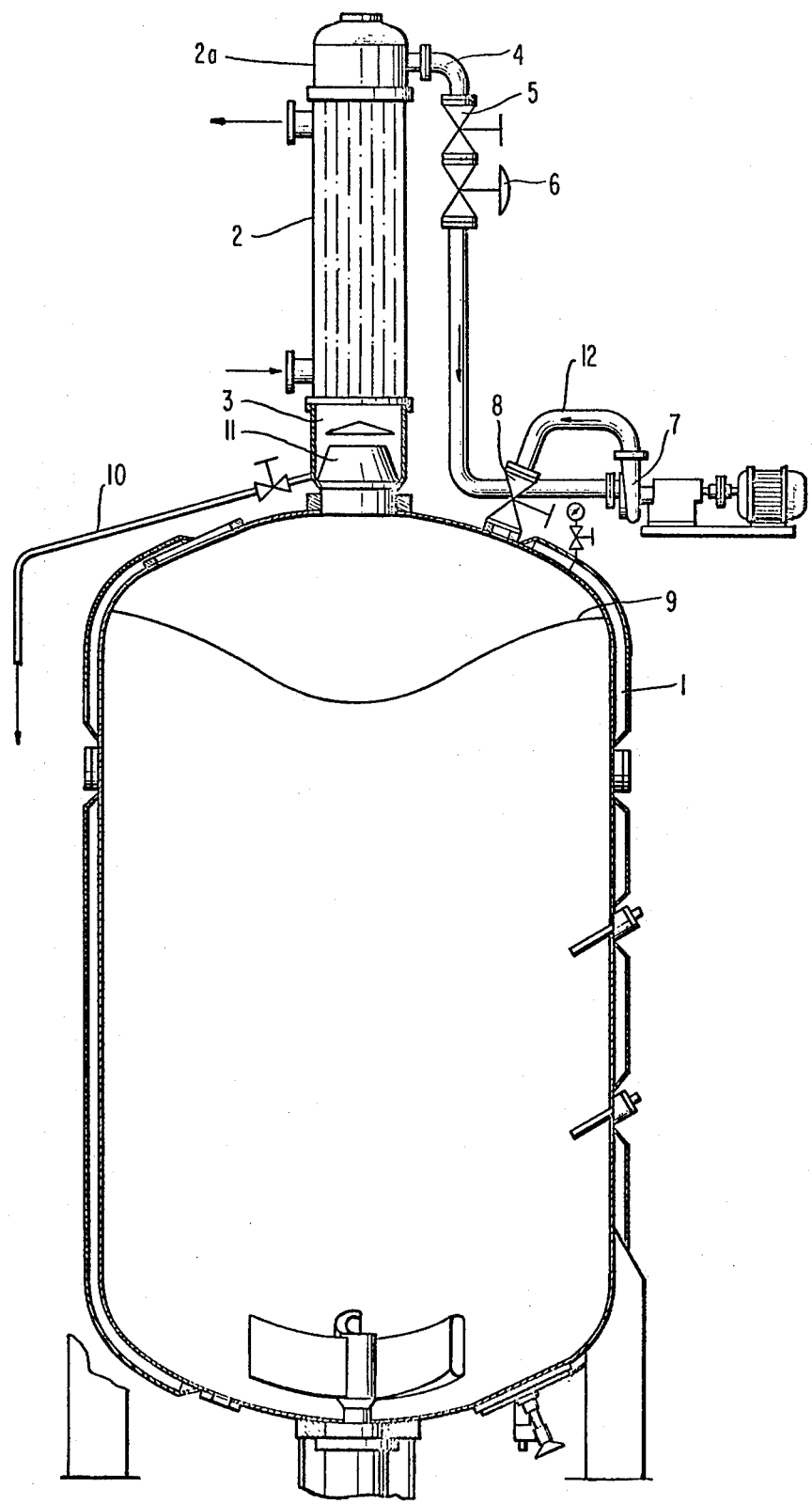

COOLING UNIT FOR LARGE POLYMERIZATION VESSELS

This is a division of application Ser. No. 167,568, filed July 30, 1971, and now U.S. Pat. No. 3,785,430, issued Jan. 15, 1974.

Polymerization reactions are customarily carried out in compression-proof agitator-equipped reactors or vessels. The polymers are obtained either finely dispersed or emulsified in a carrier liquid (emulsion or suspension polymerization), or they are dissolved immediately after the production in the carrier liquid (solution polymerization). If the monomer proper is employed as the carrier liquid, one speaks of a bulk polymerization.

Polymerization reactions are exothermic. During the polymerization process, an amount of heat must be removed which is composed of the product of the specific polymerization heat and of the mass of the formed polymeride, the heat of agitation, and the heating energy. In case of rather small polymerization vessels having a size of up to 20 m$^3$ in capacity, this amount of heat can be removed by cooling the walls. As long as no deposits, impairing the heat flow, are formed on the reactor walls during the polymerization, it is also possible to cool larger vessels by means of cooling coils which, in addition to the wall cooling system, are mounted on the inside of the vessel. However, if deposits are formed, the use of cooling coils is not suitable, since they can be cleaned only with difficulties. Therefore, reflux condensers or coolers are utilized—especially in case of vessels having capacities of more than 20 m$^3$— which are in communication with the gas space of the reactor, and in which a part of the condensible components of the gas is precipitated above the liquid polymerization charge and can flow back into the vessel.

The German Pat. No. 1,013,870 describes a cooling system for polymerization reactors in which gas is evacuated from the hood, is then compressed and is thereupon introduced into the reactor, either in part or in its entirety, dissolved in the carrier liquid or in the monomer.

A gas circulation method with partial condensation is described in the German DAS No. 1,025,143. Gas is thereby evacuated from the head of the condenser, compressed, and fed into the reactor through injection nozzles which are disposed at the bottom of the polymerization reactor.

The German DOS No. 1,495,145 describes a reflux cooling system in which the temperature of the polymerization charge is controlled, by regulating the coolant supply to the reflux cooler in dependence on the polymerization temperature.

All of the above-mentioned processes exhibit disadvantages which have a particularly grave effect on the polymerization of reactor or vessel contents of more than 40 m$^3$.

The compressors required for the realization of the process according to German Pat. No. 1,013,870 are expensive in their acquisition and costly in their operation, especially since the entrained solid particles present in trace amounts in the gaseous stream proper can damage the compressor.

The process according to DAS No. 1,025,143 is uneconomical or technically non-realizable when applied to the polymerization of reactor contents of 40 m$^3$ or greater. The amount of circulating gas must be brought to a pressure larger than the sum of the hydrostatic pressure in the reactor and the pressure drop at the injection nozzles. This pressure is generally higher than 4 meters H$_2$O column and can be produced with the aid of a radial cylinder compressor or a rotary piston compressor. These machines are mechanically sensitive to any entrained polymer particles and have a high energy consumption. In case of polymerization reactors having contents greater than 40 m$^3$, this cooling method is difficult to carry out during the polymerization of foaming charges, because the gas space of the polymerization vessel is filled with foam already a short time after the beginning of the process.

Also the method described in DOS 1,495,145 is only poorly suitable for the polymerization of charges of 40 m$^3$ or larger. During the polymerization of vinyl chloride in a reactor having a size of more than 40 m$^3$, thermal loads of more than 500,000 kcal/h occur. Tests have demonstrated that, in this process, the heat-transfer values in the reflux cooler, instead of the values of between 500 and 5,000 kcal/m$^2$·h·° C. ordinarily to be expected for condensing gases, were only less than 300 kcal/m$^2$·h·° C., and that these coefficients varied considerably and additionally were particularly low during the polymerizing phase with the highest reaction velocity. This had as a consequence that the temperature could be controlled only with difficulties. After the tests, the inlets of the reflux cooler pipes were covered with deposits of the product.

The present invention is based on the task to provide a reflux cooling process and an apparatus for the realization thereof which ensure a completely satisfactory cooling function also during polymerizations in vessels with contents of 40 m$^3$ and greater and with occurring thermal loads of more than 500,000 kcal/h.

The underlying problems are solved according to the present invention in that the gas is either force-fed from the gas space of the polymerization vessel through the reflux condenser or cooler into the reflux condenser or cooler head and from there into the gas space of the polymerization reactor or is force-fed in the opposite direction from the reflux condenser or cooler head through the reflux condenser or cooler into the gas space of the polymerization vessel and from there into the reflux condenser or cooler head.

The advantages attained by the present invention reside especially in the completely satisfactory removal of heat from polymerization charges of 40 m$^3$ and larger, and in a very good control of the temperature of these polymerization batches. A further advantage of the present invention resides in the simple apparatus and the economic mode of operation attainable thereby.

These and other objects, features and advantages of the present invention will become more apparent from the following description when taken in connection with the accompanying drawing which shows, for purposes of illustration only, one embodiment of the present invention, and wherein:

The single FIGURE is a schematic view illustrating a polymerization reactor with a reflux cooling unit in accordance with the present invention.

Referring now to the single FIGURE of the drawing, reference numeral 1 designates therein a polymerization reactor or vessel which is operated with a liquid level, i.e., is not completely filled. Due to the agitation by conventional means, the surface of the liquid has the shape of a funnel 9.

A conventional reflux condenser or cooler 2 is centrally mounted on the reactor hood; this reflux cooler 2 has an amount of coolant flowing therethrough which is constant per unit of time. Vapors ascend from the gas space of the polymerization vessel into this reflux condenser or cooler 2. A portion of the vapors is condensed in the reflux cooler 2; the condensate which flows downwardly into the drain or duct 3, can be withdrawn therefrom with the aid of conduit 10 and can be fed back to the vessel at some other point, or it may overflow at the upper edge 11 of the drain 3 and fall back into the funnel 9. A pipe 4 is attached to the head 2a of the reflux cooler 2, leading to a rotary pump 7. A control element 6 is provided in the pipe 4, in addition to a closure valve 5. The rotary pump 7 is connected, by means of line 12, with the vessel hood by way of a closure valve 8.

If the vapors rising from the reactor into the reflux cooler 2 are free of solid particles, the greatest cooling effect is obtained if the gas is conducted from the reflux cooler 2 into the reactor hood by means of the rotary pump 7 by way of the conduits 4 and 12, i.e., if the gas is circulated in such a manner that the gaseous stream flows in the same direction as the vapor stream in the reflux condenser.

In contrast thereto, if the vapors entrain solid particles, these particles may cover the reflux condenser surfaces and may reduce the heat transfer. In this case, it is recommended to supply the gas from the reactor hood into the reflux cooler head — and thus in countercurrent to the vapors.

This forced circulation of the gas through the reflux cooler can be effected by means of a device provided on outside of the reflux cooler, for example, by means of a rotary pump, as well as with the aid of a device installed on the inside of the reflux cooler, for example with the aid of a blower. Also a gas conduit operatively connecting the reflux cooler head with the gas space of the polymerization vessel is arranged inside the reflux cooler means. In the latter case, a conduit disposed externally of the reflux cooler and connecting the reflux cooler head with the gas space of the polymerization reactor is no longer necessary.

In both cases, the throughflow of the gas is varied in dependence on the temperature in the liquid space of the polymerization vessel in such manner that a rise in temperature effects an increase in the gas throughflow and therewith in the cooling effect. In this way, the temperature in the liquid space of the polymerization vessel is controlled by varying the throughflow of the force-fed gas.

The change in gas throughflow can be achieved either by continuously varying the output of the gas-feed device or — as in the example of this invention — by the continuous change of the effective cross section of the gas conduit with the aid of a control element 6 with a constant output of the gas-feed device.

The effectiveness of the reflux cooling unit of this invention will be explained by reference to the following example.

EXAMPLE

In a polymerization reactor having a capacity of 100 m$^3$, a charge of emulsion polyvinyl chloride was produced. The reflux cooler had a surface area of 170 m$^2$. The coolant for the reflux cooler was fresh water with an inlet temperature of 20° C.; the water was discharged from the reflux cooler heated to about 40° C. The rotary pump had a gas-feed capacity of about 100 m$^3$/h. During the polymerization reaction, the internal pressure in the polymerization reactor was 8 to 9 atmospheres gauge; the temperature in the liquid space was 55° C. During the reaction period of 4 hours, 27 tons of emulsion-polyvinyl chloride was produced, corresponding to a heat of polymerization of about 12 million kilogram calories with an average heat load of 3 million kcal/h. This results in a heat transfer value in the reflux cooler of 720 kcal/m$^2 \cdot$h$\cdot$° C. The temperature in the liquid space was kept constant with an accuracy of ±1.5° C. During the reaction, no foams occurred, although the aqueous phase of the emulsion had an interfacial surface tension of 50 dyne/cm$^2$.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. An apparatus for cooling of polymerization charges in a polymerization vessel having a liquid level and a gas space above said liquid level, comprising a reflux cooler means including a reflux cooler head mounted on the polymerization vessel above said liquid level and in direct open communication with the gas space of the polymerization vessel, a gas conduit means operatively connecting the reflux cooler head with the polymerization vessel and being in communication with the gas space of the polymerization vessel, and means in said gas conduit means for providing a force-feeding of the gas through said gas conduit means, said reflux cooler means and said gas space.

2. An apparatus according to claim 1, wherein the gas conduit means operatively connecting the reflux cooler head with the gas space of the polymerization vessel is arranged outside of the reflux cooler means.

3. An apparatus according to claim 1, wherein the gas conduit means operatively connecting the reflux cooler head with the gas space of the polymerization vessel is arranged inside the reflux cooler means.

4. An apparatus according to claim 1, wherein said reflux cooler means is mounted substantially centrally on the polymerization vessel.

5. An apparatus according to claim 1, wherein said means in the conduit means comprises a pump means for pumping said gas through a circulatory system provided by said gas conduit means, said gas space and said reflux cooler means.

6. An apparatus according to claim 1, wherein said polymerization vessel is an elongated vertically disposed cylindrical reactor and said reflux cooler means is located at the top of said reactor.

7. An apparatus according to claim 1, wherein said gas conduit means includes valve means for regulating the flow of gas therethrough.

8. An apparatus for cooling a polymerization vessel which is operated with a liquid level and which has a gas space above the liquid level, comprising a reflux cooler means mounted centrally on top of a hood of the polymerization vessel, said reflux cooler means having a lower portion in direct open communication with the gas space of the polymerization vessel and a gas conduit means operatively connecting an upper head of the reflux cooler means with the gas space of the polymerization vessel and means within said gas conduit means for providing a force flow of the gas therethrough and means for controlling the flow of gas within said gas conduit means.

9. An apparatus according to claim 8, wherein said gas conduit means connecting the upper head of the reflux cooler means with the gas space of the polymerization vessel and the means for providing a force flow and the control means are arranged inside the reflux cooler.

* * * * *